United States Patent [19]

Massar

[11] 4,172,987

[45] Oct. 30, 1979

[54] ELECTRICAL LIQUID CONTACT FOR AN ELECTRICAL MACHINE SUCH AS AN ELECTRIC UNIPOLAR MACHINE HAVING A HORIZONTAL SHAFT OR THE LIKE

[75] Inventor: Ernst Massar, Erlangen, Fed. Rep. of Germany

[73] Assignee: Siemens Aktiengesellschaft, Munich, Fed. Rep. of Germany

[21] Appl. No.: 834,470

[22] Filed: Sep. 19, 1977

Related U.S. Application Data

[63] Continuation of Ser. No. 612,452, Sep. 11, 1975, abandoned.

[30] Foreign Application Priority Data

Sep. 24, 1974 [DE] Fed. Rep. of Germany ....... 2446220

[51] Int. Cl.² .......................................... H02K 31/00
[52] U.S. Cl. .................................... 310/178; 310/219
[58] Field of Search .................... 310/178, 219, 232; 322/48; 318/253

[56] References Cited

U.S. PATENT DOCUMENTS

| | | | |
|---|---|---|---|
| 2,401,166 | 5/1946 | Kobel | 310/178 |
| 2,786,155 | 3/1957 | Sellers | 310/178 |
| 2,828,431 | 3/1958 | Klaudy | 310/178 |
| 3,211,936 | 10/1965 | Harvey | 310/219 |
| 3,293,470 | 12/1966 | Polgreen | 310/178 |
| 3,436,575 | 4/1969 | Harvey | 310/178 |
| 3,453,467 | 7/1969 | Harvey | 310/178 |
| 3,546,508 | 12/1970 | Harvey | 310/178 |
| 3,796,900 | 3/1974 | McNab | 310/178 |

*Primary Examiner*—R. Skudy
*Attorney, Agent, or Firm*—Kenyon & Kenyon

[57] ABSTRACT

The invention is directed to an electrical liquid contact for an electrical machine such as an electric unipolar machine with a horizontal shaft. The liquid contact includes a ring gap which is sealed laterally by ring gaps which extend at an angle or radially and in which the metallic liquid present therein is set in rotation. This is accomplished by a circulating pump located outside the ring gap. In addition, the speed of rotation in the ring gap is matched to the pressure of the liquid by changing the cross-sectional area of the passage through which the liquid flows.

7 Claims, 3 Drawing Figures

ELECTRICAL LIQUID CONTACT FOR AN ELECTRICAL MACHINE SUCH AS AN ELECTRIC UNIPOLAR MACHINE HAVING A HORIZONTAL SHAFT OR THE LIKE

This is a continuation of application Ser. No. 612,452, filed Sept. 11, 1975, now abandoned.

BACKGROUND OF THE INVENTION

The invention relates to an electrical liquid contact between a rotating annular member and an opposite, likewise annular member. These members define a central ring gap which is filled with a metallic liquid under pressure and which is bounded on each side by a lateral ring gap which extends radially or at an angle. Means are provided for sealing against the escape of the liquid at the sides of the central ring.

Such an electrical liquid contact, which is suited particularly for an electric unipolar machine with a horizontal shaft, is disclosed in Deutsche Auslegeschrift No. 1,246,102. In this known arrangement, circular ribs which are interleaved in the manner of a labyrinth seal are arranged to the sides of the liquid contact at the stationary member as well as at the rotating member. This is to prevent the metallic liquid from escaping laterally. However, labyrinth seals do contain a gap, so that, particularly at standstill, a part of the metallic liquid trickles out, especially since, with the very large diameters of the ring gas of the liquid contacts required for a unipolar machine of large power rating, considerable pressure differences between the members at the top and the bottom of the ring gap occur, which lead to an additional stress on the lateral seals. However, if the unipolar machine is to be used as a motor and is to be operated with varying speeds and directions of rotation, then the sealing of the ring gap against an escape of the liquid must be effective also if the machine is standing still.

SUMMARY OF THE INVENTION

It is an object of the invention to provide an electrical liquid contact for an electrical machine such as an electric unipolar machine with a horizontal shaft wherein a lateral seal of the liquid contact is achieved which is of simple construction and is reliably effective also at standstill.

This object is realized in a liquid electrical contact of the type described above by providing, according to a feature of the invention, means for rotating the metallic liquid conductor in the lateral ring gaps. In addition, the speed of rotation of the liquid conductor in the lateral gaps is matched proportionally to the pressure of the liquid conductor; this pressure varies with the height above the lowest point of the rotating annular member and the proportional match is obtained by providing a corresponding change of the cross-sectional area in the lateral ring gaps. The sealing of the central ring gap is thus accomplished by the rings of liquid which rotate in the respective lateral ring gaps and which are pushed into the radially outermost parts of the lateral ring gaps due to the centrifugal force which occurs here. Reliable sealing of the central ring gas is thereby obtained even for relatively large gap widths without solid materials touching each other.

According to the invention, the centrifugal force occuring during the rotation of the liquid rings is now matched to the corresponding hydraulic pressure in the lateral ring gap along the circumference by changing the speed of rotation by a corresponding change of the cross-sectional area through which the liquid ring passes. This change of the cross-section of the rotating liquid ring between the highest and the lowest point of the lateral ring gaps at the annular rotating part is executed so that the smallest cross-sectional area is at the bottom, and accordingly, the highest speed of rotation. This highest speed of rotation is chosen so that it still holds the balance with certainty to the highest hydraulic pressure occuring in the lateral ring gap. Because the speed of rotation changes over the circumference of the ring gap, the friction losses also change accordingly, the latter depending upon the third power of the speed of rotation. Large friction losses occur only in the lowest part of the liquid contact and decrease with increasing height of the ring gap very rapidly to small values, so that the total friction losses are far smaller than in a liquid contact in which the metallic liquid rotates with constant speed of rotation along the entire circumference.

According to a further feature of the invention, the rotation of the liquid in the lateral ring gaps is produced by one or several circulating pumps which are arranged outside of the lateral ring gaps and through which a part of the liquid rotating in the lateral ring gaps is conducted. This part of the liquid is brought out at a suitable location and the pumps supply thereto the required energy by increasing the pressure in order to maintain the rotation with the desired constant velocity and thus to cover the friction losses.

The divertion of the above-mentioned part of the liquid and its return into the lateral ring gap is advantageously accomplished in the region whereat speeds of rotation are high, that is, in the lower part of the liquid contact. Through the re-introduction of this partial liquid quantity accelerated by the circulating pump into the rotating liquid ring in the region of high velocities, essentially only the kinetic energy of the liquid ring is increased but its height is not influenced, which would result in design problems.

Although the invention is illustrated and described herein as an electrical liquid contact for an electrical machine such as an electric unipolar machine having a horizontal shaft or the like, it is nevertheless not intended to be limited to the details shown, since various modifications may be made therein within the scope and the range of the claims. The invention, however, together with additional objects and advantages will be best understood from the following description and in connection with the accompanying drawings.

DESCRIPTION OF THE PREFERRED EMBODIMENTS OF THE INVENTION

Figure 1:
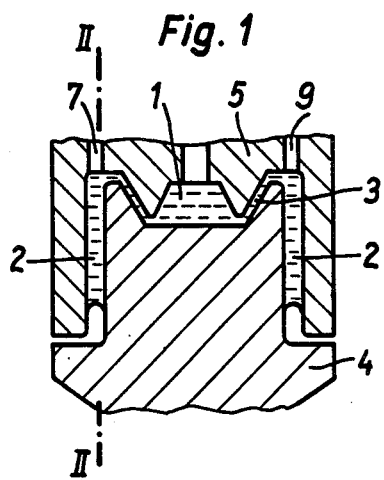
FIG. 1 shows a cross-section through a liquid electrical contact according to the invention for a unipolar machine with a horizontal shaft. In this view, only those portions of the shaft and annular stationary part needed to illustrate the contact cross-section are shown.

The electric unipolar machine has a horizontal shaft and is operated, for instance, as a ship's engine with varying speeds and directions of operation. The liquid contact of the unipolar machine includes a central ring gap 1. On each side of the central ring gap 1, a radially extending lateral ring gap 2 is arranged which starts out from a radius which is smaller than the smallest radius of the central ring gap and leads to a radius which is larger than the radius at which the inclined connecting canals 3 between the lateral ring gap 2 and the central ring gap 1 are introduced into the central ring gap 1. The central ring gap 1 and the lateral ring gaps 2 are filled out by a highly electrically conductive metallic liquid under pressure. Thereby, the contact between the rotating annular part 4 and the likewise annular, stationary part 5 of the unipolar machine surrounding the former is established.

Figure 2:
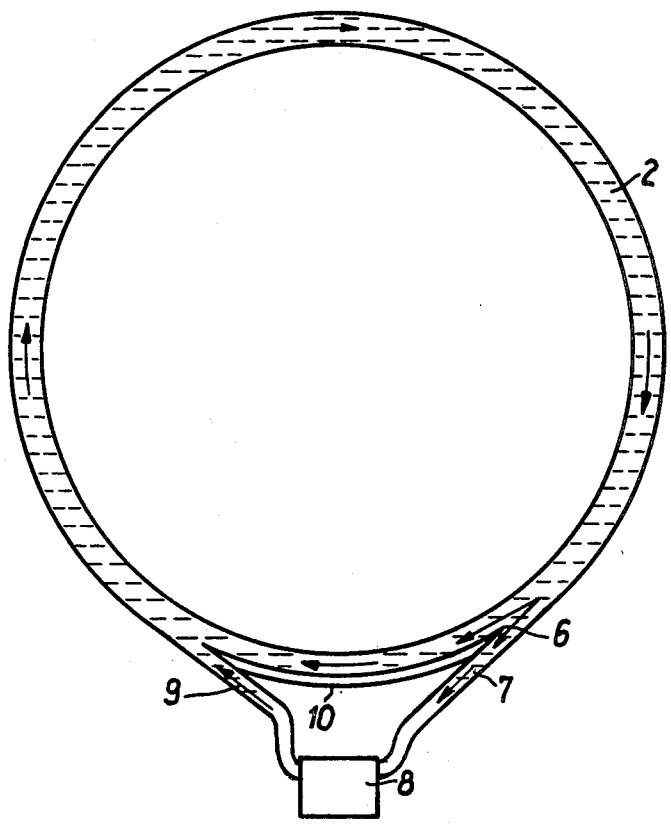
FIG. 2 shows schematically an elevation view of the entire circumference of the liquid electrical contact taken at line II—II of FIG. 1.

To seal the liquid contact against a lateral escape of the metallic liquid, the liquid rotates in the respective lateral ring gaps 2 in the direction of the arrows shown in FIG. 2. At the point 6 in the vicinity of the lowest point along the circumference of the lateral ring gap 2, a canal 7 which leads to a circulating pump 8 branches off from the ring gap 2. Part of the metallic liquid circulating in the ring gap 2 is therefore fed, through the canal 7, to the circulating pump 8, where it is brought to a higher pressure. Then, the liquid flows, if necessary after passing through heat exchangers and purifiers (not shown), back into the ring gap 2 through canal 9. In this manner, the friction losses occurring in the ring gaps 2 are compensated for, so that the rotation of the liquid ring can be maintained unchanged at the desired speeds. The branching of the canals 7 and 9 from the ring gap 2 is arranged tangentially so that losses are minimized when part of the metallic liquid passes into these canals. The canals 7 and 9 then constitute guide means for guiding a portion of the liquid metal in the lateral ring gaps to the circulation pump from the lateral ring gaps and for returning the same after pumping back to the lateral ring gaps.

Because of the variable dimension of the cross-sectional passage for the metallic liquid, which passage becomes smaller from top to bottom, the speed of rotation in the ring gap 2 has always different values which are proportional to the different values of the hydraulic pressure at the different positions of elevation. At the lowest point 10 of the ring gap 2, the speed of rotation is a maximum and is chosen so that the centrifugal force caused by it holds the balance with certainty to the hydraulic pressure in the ring gap 2, which is a maximum here.

Figure 3:
FIG. 3 is a side view of the lateral ring gap shown in FIG. 2.

The change of the cross-sectional area along the ring gap 2 is achieved by changing the width of the gap. FIG. 3 shows that the gap width increases linearly with the height above the lowest point 10 of the ring gap 2. This configuration is particularly practical as with it, the radial height of the rotating liquid in the ring gap 2, except for small differences at the branching points, is practically constant at all points of the circumference of the ring gap 2.

What is claimed is:

1. In an electrical machine such as a unipolar machine equipped with a ring-shaped rotatable member and a stationary member mutually adjacent the rotatable member, the stationary member being likewise ring-shaped, an electric liquid contact arrangement including first and second surfaces formed on the members respectively, said surfaces being mutually adjacent to conjointly define a central annular gap therebetween filled with a liquid metal under pressure, said surfaces also conjointly defining lateral ring gaps bounding said central gap on respective lateral sides thereof, wherein the improvement in said contact arrangement prevents escape of liquid metal in said central annular gap and comprises:

each of said lateral ring gaps extending above and below the highest and lowest points, respectively of said central annular gap;

rotating means for rotating liquid metal in said lateral ring gaps during rotation and standstill of said rotatable member; and means for matching the rotational speed of the liquid metal in said lateral gaps proportionally to the pressure of said liquid metal therein;

said rotating means and means for matching the rotational speed of the liquid metal being operative to prevent escape of the liquid metal in said central annular gap during rotation and standstill of said rotatable member.

2. The improvement of claim 1 wherein the pressure of the liquid metal varies with the elevation above the lowest location of said rotatable member, said means for matching comprising each of said lateral gaps being formed to have a cross-section varying in correspondence to said pressure of said liquid metal therein.

3. The improvement of claim 2, each of said lateral gaps having a gap width which continuously changes to increase said cross-section thereof.

4. The improvement of claim 2, said rotating means comprising a circulation pump disposed outside of said lateral ring gaps for pumping a portion of the liquid metal in each of said lateral gaps; and guide means for guiding said portion of the liquid metal to said circulation pump from said lateral ring gaps and for returning the same after pumping back to said lateral ring gaps.

5. The improvement of claim 4, said guide means being disposed at the region of said lateral ring gaps whereat said rotational speed is higher than in the remainder thereof.

6. In an electrical machine such as a unipolar machine equipped with a ring-shaped rotatable member and a stationary member mutually adjacent the rotatable member, the stationary member being likewise ring-shaped, an electric liquid contact arrangement including a liquid metal under pressure and first and second surfaces formed on the members respectively, said surfaces being mutually adjacent to conjointly define a central annular gap therebetween filled with the liquid metal under pressure, said surfaces also conjointly defining lateral ring gaps bounding said central gap on respective lateral sides thereof, said lateral ring gaps each extending from said center gap and being interconnected therewith, wherein the improvement in said contact arrangement prevents escape of liquid metal in said central annular gap and comprises:

each of said lateral ring gaps extending above and below the highest and lowest points, respectively of said central annular gap;

rotating means for rotating liquid metal in said lateral ring gaps during rotation and standstill of said rotatable member; and means for matching the rotational speed of the liquid metal at different positions above and below the highest points in said lateral gaps proportionally to the pressure of said liquid metal thereat;

said rotating means and means for matching the rotational speed of the liquid metal being operative to prevent escape of the liquid metal in said central annular gap during rotation and standstill of said rotatable member.

7. The improvement of claim 6, wherein said lateral ring gaps extend radially from said center gap.

* * * * *